United States Patent
Hanzawa et al.

(10) Patent No.: US 9,873,826 B2
(45) Date of Patent: Jan. 23, 2018

(54) CHEMICAL HEAT PUMP

(71) Applicant: NGK INSULATORS, LTD., Nagoya (JP)

(72) Inventors: Shigeru Hanzawa, Kakamigahara (JP); Kouji Ogura, Chiryu (JP)

(73) Assignee: NGK Insulators, Ltd., Nagoya (JP)

( * ) Notice: Subject to any disclaimer, the term of this patent is extended or adjusted under 35 U.S.C. 154(b) by 79 days.

(21) Appl. No.: 14/967,768

(22) Filed: Dec. 14, 2015

(65) Prior Publication Data

US 2016/0177161 A1  Jun. 23, 2016

(30) Foreign Application Priority Data

Dec. 22, 2014  (JP) .................. 2014-258823

(51) Int. Cl.
*C09K 5/16* (2006.01)
*F28D 20/00* (2006.01)
(Continued)

(52) U.S. Cl.
CPC .................. *C09K 5/16* (2013.01); *F01K 3/12* (2013.01); *F25B 17/083* (2013.01); *F28D 20/003* (2013.01)

(58) Field of Classification Search
CPC ..... C09K 5/16; F01K 3/12; F01K 3/16; F01K 3/002; F25B 17/083; F25B 17/086;
(Continued)

(56) References Cited

U.S. PATENT DOCUMENTS 5,386,709 A * 2/1995 Aaron ................. F25B 5/02
62/199
5,901,780 A * 5/1999 Zeigler .............. B60H 1/032
123/142.5 R
(Continued)

FOREIGN PATENT DOCUMENTS

EP  2 767 570 A2  8/2014
FR  2 470 356 A1  5/1981
(Continued)

OTHER PUBLICATIONS

Translation of Abstract of JP 2012-163306 to Kazuki et al.*
(Continued)

*Primary Examiner* — Mohammad M Ali
(74) *Attorney, Agent, or Firm* — Burr & Brown, PLLC

(57) ABSTRACT

This chemical heat pump includes two reaction sections R1 and R2 containing a thermal storage medium; an evaporation-condensation section D containing water or steam; and two fluid channels individually disposed so as to correspond to the reaction sections. A "first state in which R1 is set to a heat-storing state and R2 is set to a heat-release state" and a "second state in which R1 is set to a heat-release state and R2 is set to a heat-storing state" are alternately applied every time after a first period elapses. For each reaction section, in the heat-release state, a fluid is caused to flow from a first side to a second side of the corresponding fluid channel over a first period; and, in the heat-storing state, a fluid is caused to flow from the second side to the first side of the corresponding fluid channel over a second period.

10 Claims, 9 Drawing Sheets

(51) Int. Cl.
*F25B 29/00* (2006.01)
*F01K 3/12* (2006.01)
*F25B 17/08* (2006.01)

(58) Field of Classification Search
CPC ........ F25B 29/00; F25B 17/04; F28D 20/003; F28D 20/00; Y02B 30/70; Y02B 30/72; Y02B 30/76
USPC .............................. 62/4, 324.2; 165/104.12
See application file for complete search history.

(56) References Cited

U.S. PATENT DOCUMENTS

| | | | | |
|---|---|---|---|---|
| 6,560,971 | B2* | 5/2003 | Takao | C09K 5/066 585/15 |
| 2010/0158763 | A1* | 6/2010 | Dannoux | B01J 19/0093 422/130 |
| 2010/0236758 | A1* | 9/2010 | Ullman | B64D 13/00 165/104.19 |
| 2011/0100611 | A1* | 5/2011 | Ohler | F01K 3/00 165/104.28 |
| 2011/0226447 | A1* | 9/2011 | Mieda | F28D 7/022 165/104.12 |

FOREIGN PATENT DOCUMENTS

| | | |
|---|---|---|
| JP | 2008-025853 A1 | 2/2008 |
| JP | 2012-163306 A1 | 8/2012 |
| JP | 2013-195022 A1 | 9/2013 |

OTHER PUBLICATIONS

Translation of description of JP 2012-163306 to Kazuki et al.*
Extended European Search Report (Application No. 15201411.4) dated May 19, 2016.

* cited by examiner

CHEMICAL HEAT PUMP

BACKGROUND ART

1. Field of the Invention

The present invention relates to a chemical heat pump.

2. Description of the Related Art

In recent years, from the standpoint of, for example, efficient use of resources and energy, there has been an increasing need for realization of a "technique of storing heat of an exhaust gas (hereafter referred to as an "inflow gas") from a factory or the like and using the stored heat to output a gas (hereafter referred to as an "outflow gas") having a higher temperature than the exhaust gas". Such a need arises in a case of firing of molded members, for example. In this case, an exhaust gas having been used for cooling high-temperature fired members immediately after firing is used as an "inflow gas" and an "outflow gas" having a higher temperature than the "inflow gas" is output; and the output "outflow gas" is used to increase the temperature of molded members during firing.

As a unit for realizing this technique, a chemical heat pump (a heat pump having a chemically-heat-storing system) has been proposed (for example, refer to Patent Literatures 1 and 2).

The chemical heat pumps described in the literatures have a "reaction section containing a thermal storage medium that undergoes an exothermic reaction and an endothermic reaction", an "evaporation-condensation section that contains steam and water and causes phase transition between steam and water", a "connection section connecting the reaction section to the condensation section", and a "fluid channel that causes heat exchange between a fluid flowing therein and the thermal storage medium". This "thermal storage medium" has, for example, a property of the thermal storage itself (first property) of that "undergoing an exothermic reaction with steam and forming a hydrate with release of heat", and a property of the hydrate (second property) of "upon receiving of external heat, undergoing an endothermic reaction for the hydrate and being dehydrated through release of steam from the hydrate and with storing of heat".

The thermal storage medium has a "transformation temperature", which is a temperature critical point of state transformation between the thermal storage medium itself (=dehydrated medium) and its hydrate. The transformation temperature of such a thermal storage medium varies depending on the type of thermal storage medium and also fluctuates in response to the ambient pressure of the thermal storage medium. The "exothermic reaction" (dehydrated medium turns into hydrate) in the first property can occur only when the temperature of the inflow gas is equal to or lower than the transformation temperature of the thermal storage medium. The "endothermic reaction" (hydrate turns into dehydrated medium) in the second property can occur only when the temperature of the inflow gas is equal to or higher than the transformation temperature of the thermal storage medium.

In this chemical heat pump, in a heat-storing state, an inflow gas having a temperature higher than the transformation temperature of the thermal storage medium is caused to flow into the fluid channel. When the inflow gas flowing through the fluid channel passes a position where the heat exchange occurs, the hydrate of the thermal storage medium in the reaction section receives heat from the inflow gas. As a result, because of the "second property", the "endothermic reaction" for the hydrate occurs and the hydrate is dehydrated into the thermal storage medium itself (=dehydrated medium), also causing an increase in the temperature of thermal storage medium (in other words, the thermal storage medium stores heat). The steam (gas) generated by the dehydration moves through the connection section from the reaction section to the evaporation-condensation section. The steam having moved to the evaporation-condensation section undergoes phase transition (condensation) and turns into water (liquid). This water is stored in the evaporation-condensation section. The inflow gas is deprived of heat by the "endothermic reaction". As a result, the temperature of a gas flowing out from the fluid channel becomes lower than the temperature of the inflow gas flowing into the fluid channel. In summary, in the heat-storing state, an inflow gas having a temperature higher than the transformation temperature of the thermal storage medium is caused to flow into a fluid channel, so that a portion of heat of the inflow gas can be stored in the thermal storage medium (=dehydrated medium).

On the other hand, in a heat-release state, an inflow gas having a temperature lower than the transformation temperature of the thermal storage medium is caused to flow into the fluid channel. Steam generated by phase transition (evaporation) of water in the evaporation-condensation section moves from the evaporation-condensation section to the reaction section. As a result, because of the "first property", the "exothermic reaction" occurs between the "thermal storage medium (=dehydrated medium) in the reaction section" and "steam". Thus, the thermal storage medium releases heat and turns into its hydrate. When an inflow gas flowing through the fluid channel passes a position where the heat exchange occurs, the inflow gas receives heat derived from release of heat from the thermal storage medium. As a result, the temperature of an outflow gas flowing out from the fluid channel becomes higher than the temperature of the inflow gas flowing into the fluid channel. In summary, in the heat-release state, an inflow gas having a temperature lower than the transformation temperature of the thermal storage medium is caused to flow into a fluid channel, so that an outflow gas having a higher temperature than the inflow gas can be output.

CITATION LIST

Patent Literature

PTL 1: JP 2008-025853 A
PTL 2: JP 2013-195022 A

SUMMARY OF THE INVENTION

The heat-release state (in other words, the exothermic reaction) can be continuously applied until the thermal storage medium itself (=dehydrated medium) is consumed in the reaction section. Stated another way, in the heat-release state, an outflow gas having a higher temperature than the inflow gas can be output until the thermal storage medium itself in the reaction section is consumed; however, after which, the outflow gas having a higher temperature than the inflow gas cannot be output (refer to FIG. 4 described later). In addition, there is a limit on the amount of thermal storage medium that can be contained in a single reaction section.

Accordingly, a configuration employing a single reaction section has a limit on a period for which, in the heat-release state, the temperature of the outflow gas can be maintained to be (substantially) constant at a temperature (target temperature) higher than the temperature of the inflow gas.

Stated another way, the configuration employing a single reaction section cannot meet a demand that the temperature of the outflow gas is maintained to be (substantially) constant at the target temperature over a given long period of time.

In order to address such a problem, a configuration employing two reaction sections (a first reaction section and a second reaction section) may be conceived. Specifically, for example, a maximum period for which the temperature of the outflow gas can be maintained to be constant at the target temperature with a single reaction section is defined as a "duration" (constant); and the configuration can alternately apply, every time after the "duration" elapses, a "first state in which the first reaction section is set to the heat-storing state and the second reaction section is set to the heat-release state" and a "second state in which the first reaction section is set to the heat-release state and the second reaction section is set to the heat-storing state". As a result, the temperature of the outflow gas can be maintained to be (substantially) constant at the target temperature over a given long period of time (refer to FIG. 7 described later).

In general, the thermal storage medium contained in the reaction section gradually deteriorates with an increase in the total time for which the thermal storage medium is used for the exothermic reaction and the endothermic reaction. This "deterioration of the thermal storage medium" denotes a phenomenon in which the amount of heat storable per unit mass of the thermal storage medium decreases.

Here, attention will be directed to a gas flow direction (hereafter referred to as a "heat-storing-time flow direction") within the fluid channel in the heat-storing state, and a gas flow direction (hereafter referred to as a "heat-release-time flow direction") within the fluid channel in the heat-release state.

As described above, in a case where the "first state" and the "second state" are alternately applied every time after the "duration" elapses and the thermal storage medium has deteriorated, the reaction sections can undergo a phenomenon in which the period for which the temperature of the outflow gas can be maintained to be constant at the target temperature shortens (refer to FIG. 8 described later). When the period for which the temperature of the outflow gas can be maintained to be constant at the target temperature becomes shorter than the "duration", a phenomenon can occur in which the temperature of the outflow gas significantly decreases relative to the target temperature every time immediately before an exchange between the "first state" and the "second state" (refer to FIG. 9 described later). Stated another way, the temperature of the outflow gas cannot be maintained to be (substantially) constant at the target temperature with stability.

It has been found that, depending on whether the "heat-storing-time flow direction" and the "heat-release-time flow direction" are the same or opposite to each other, there is a difference in the degree to which deterioration of the thermal storage medium causes shortening of the period for which the temperature of the outflow gas can be maintained to be constant at the target temperature. It is desirable that the temperature of the outflow gas is maintained to be (substantially) constant at the target temperature with stability over a given long period of time.

The present invention has been accomplished in view of what is described above. An object of the present invention is to provide a chemical heat pump that can maintain the temperature of the outflow gas to be (substantially) constant at the target temperature with stability over a given long period of time.

A feature of a chemical heat pump according to the present invention is that, while the "first state" and the "second state" are alternately applied every time after a "duration" elapses, the "heat-storing-time flow direction" and the "heat-release-time flow direction" are set as being opposite to each other for each of the first and second reaction sections.

For a chemical heat pump according to the present invention, the two reaction sections (the first reaction section and the second reaction section) can be broadened to a "plurality of reaction sections" and such a chemical heat pump according to the present invention can be described as follows.

This chemical heat pump includes a "plurality of reaction sections each containing a thermal storage medium that undergoes an exothermic reaction and an endothermic reaction"; an "evaporation-condensation section that contains a substance involved in the reactions of the thermal storage medium and is configured to cause phase transition of the substance between a gas phase and a liquid phase"; a "connection section connecting the reaction sections to the evaporation-condensation section"; a "plurality of fluid channels individually disposed so as to correspond to the reaction sections such that heat exchange is caused between a fluid flowing through each of the fluid channels and the thermal storage medium contained in the corresponding reaction section"; and a "controller configured to control fluid-flows in the fluid channels". A valve configured to individually allow or block connections between the reaction sections and the evaporation-condensation section is preferably disposed.

The controller is configured to sequentially select, every time after a first period elapses, a reaction section as a heat-release reaction section from the plurality of reaction sections. The controller is configured to cause a fluid to flow through the fluid channel corresponding to the heat-release reaction section from a first side to a second side of the fluid channel over the first period, the fluid having a temperature lower than a transformation temperature of the thermal storage medium contained in the heat-release reaction section, so that the heat-release reaction section is set to a heat-release state in which the thermal storage medium releases heat to the fluid by the exothermic reaction over the first period. Also, for each of the reaction sections, after an elapse of a period of being selected as the heat-release reaction section and before beginning of a period of being selected again as the heat-release reaction section, the controller is configured to cause a fluid to flow from the second side to the first side of the fluid channel over a second period, the fluid having a temperature higher than the transformation temperature of the thermal storage medium contained in the reaction section, so that the reaction section is set to a heat-storing state in which the thermal storage medium stores heat by the endothermic reaction over the second period.

The following finding has been found, which will be described later in detail (refer to FIG. 10 and FIG. 11): compared with a case where the "heat-storing-time flow direction" and the "heat-release-time flow direction" are the same, a case where the "heat-storing-time flow direction" and the "heat-release-time flow direction" are opposite to each other allows a low degree to which deterioration of the thermal storage medium causes shortening of the period for which the temperature of the outflow gas can be maintained to be constant at the target temperature. Accordingly, compared with the case where the "heat-storing-time flow direction" and the "heat-release-time flow direction" are the same, a chemical heat pump according to the present invention tends not to undergo a phenomenon in which the temperature of the outflow gas significantly decreases relative to the target temperature every time immediately before an exchange between the "first state" and the "second state". Stated another way, the temperature of the outflow gas can be maintained to be (substantially) constant at the target temperature with more stability over a given long period of time.

BRIEF DESCRIPTION OF THE DRAWINGS

FIG. 10 is an explanatory view for, in a case where the "heat-storing-time flow direction" and the "heat-release-time flow direction" are the same, transition of the amount of heat stored in the reaction section R1 in a heat-storing state, transition of the amount of heat released in the reaction section R1 in a heat-release state, and the like.

FIG. 11 is an explanatory view for, in a case where the "heat-storing-time flow direction" and the "heat-release-time flow direction" are opposite to each other, transition of the amount of heat stored in the reaction section R1 in a heat-storing state, transition of the amount of heat released in the reaction section R1 in a heat-release state, and the like.

DESCRIPTION OF THE PREFERRED EMBODIMENTS

Hereinafter, a chemical heat pump according to an embodiment (a present embodiment) of the present invention will be described with reference to FIGS. 1 to 7.

Overall Configuration

Figure 1:
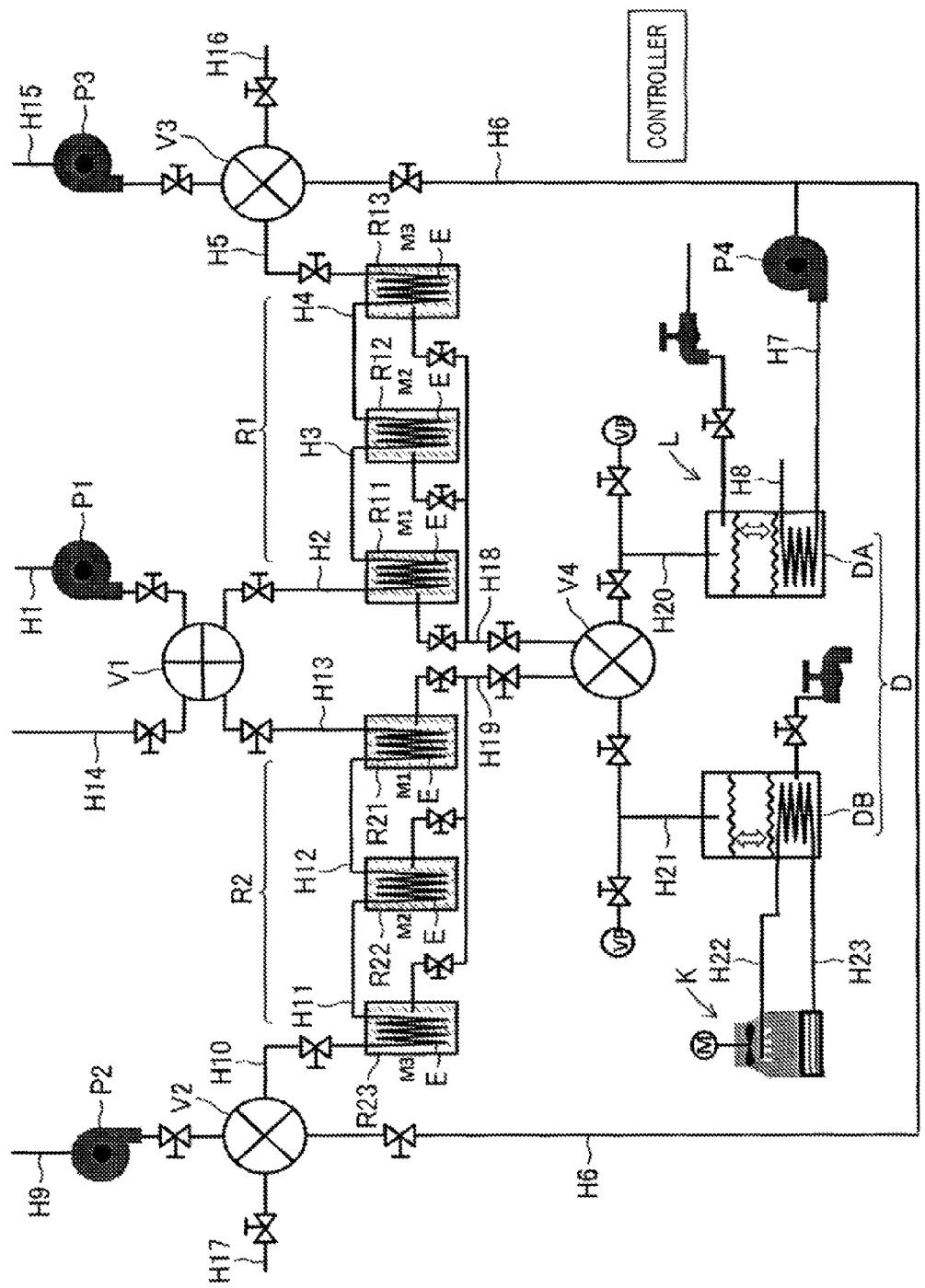
FIG. 1 is a schematic view illustrating the overall system of a chemical heat pump according to an embodiment of the present invention.

As illustrated in FIG. 1, the present embodiment includes two reaction sections R1 and R2 as the "plurality of reaction sections" and one evaporation-condensation section D as the "evaporation-condensation section". The reaction section R1 includes a reactor R11, a reactor R12, and a reactor R13 that are separate and independent from each other. The reaction section R2 includes a reactor R21, a reactor R22, and a reactor R23 that are separate and independent from each other. The evaporation-condensation section D includes an evaporator DA and a condenser DB that are separate and independent from each other.

The reaction section R1 (=R11+R12+R13) and the evaporator DA are connected to each other via a pipe H18, a four-way valve V4, and a pipe H20. The reaction section R1 (=R11+R12+R13) and the condenser DB are connected to each other via the pipe H18, the four-way valve V4, and a pipe H21. The reaction section R2 (=R21+R22+R23) and the evaporator DA are connected to each other via a pipe H19, the four-way valve V4, and a pipe H20. The reaction section R2 (=R21+R22+R23) and the condenser DB are connected to each other via the pipe H19, the four-way valve V4, and the pipe H21. The four-way valve V4 is configured to individually allow or block connections between the pipes H18, H19, H20, and H21.

These pipes H18, H19, H20, and H21 correspond to the "connection section". The four-way valve V4 corresponds to the "valve configured to individually allow or block connections between the reaction sections and the evaporation-condensation section". A pair of vacuum pumps VPs are used, after the assembly of the pump (before operation) at room temperature, to adjust the internal pressures of the pump (the internal pressures of the reaction sections R1 and R2 and the internal pressure of the evaporation-condensation section D) to be pressures lower than the atmospheric pressure.

The reactors R11, R12, and R13 are respectively charged with powder of a thermal storage medium M1, powder of a thermal storage medium M2, and powder of a thermal storage medium M3. In other words, M1, M2, and M3 are individually disposed at different positions within the reaction section R1. Similarly, the reactors R21, R22, and R23 are respectively charged with powder of the thermal storage medium M1, powder of the thermal storage medium M2, and powder of the thermal storage medium M3. In other words, M1, M2, and M3 are individually disposed at different positions within the reaction section R2.

The thermal storage media M1, M2, and M3 each have a property of thermal storage itself (first property) of "undergoing an exothermic reaction with steam and forming a hydrate with release of heat" and a property of the hydrate (second property) of "upon receiving of external heat, undergoing an endothermic reaction for the hydrate and being dehydrated through release of steam from the hydrate and with storing of heat".

Such a thermal storage medium has a "transformation temperature", which is a temperature critical point of state transformation between the "thermal storage medium itself (=dehydrated medium)" and "its hydrate". The transformation temperature of such a thermal storage medium varies depending on the type of thermal storage medium and also fluctuates in response to the ambient pressure of the thermal storage medium.

Typical examples of M1, M2, and M3 include CaO, MgO, and $CaSO_4$. CaO, MgO, and $CaSO_4$ are respectively involved in reactions represented by the following Formula (1), Formula (2), and Formula (3). In each Formula, "Q" represents thermal energy. In Formula (1), $Ca(OH)_2$ is a hydrate of CaO. In Formula (2), $Mg(OH)_2$ is a hydrate of MgO. In Formula (3), $CaSO_4 \cdot 1/2H_2O$ is a hydrate of $CaSO_4$.

$$Ca(OH)_2 + Q \rightarrow CaO + H_2O \text{ (endothermic reaction)}$$

$$Ca(OH)_2 + Q \leftarrow CaO + H_2O \text{ (exothermic reaction)} \quad (1)$$

$$Mg(OH)_2 + Q \rightarrow MgO + H_2O \text{ (endothermic reaction)}$$

$$Mg(OH)_2 + Q \leftarrow MgO + H_2O \text{ (exothermic reaction)} \quad (2)$$

$$2 \cdot CaSO_4 \cdot 1/2H_2O + Q \rightarrow 2CaSO_4 + H_2O \text{ (endothermic reaction)}$$

$$2 \cdot CaSO_4 \cdot 1/2H_2O + Q \leftarrow 2CaSO_4 + H_2O \text{ (exothermic reaction)} \quad (3)$$

At a given ambient pressure, the transformation temperature of CaO (=M1) is higher than the transformation temperature of MgO (=M2), and the transformation temperature of MgO (=M2) is higher than the transformation temperature of $CaSO_4$ (=M3). All of M1, M2, and M3 may be any one of CaO, MgO, and $CaSO_4$. Alternatively, M1, M2, and M3 may be respectively CaO, MgO, and $CaSO_4$.

The reactors (R11, R12, and R13; and R21, R22, and R23) each include a heat exchanger E having a meandering channel therein. The heat exchanger E within each reactor is embedded in a mass of powder of thermal storage medium contained within the reactor. Thus, heat exchange is configured to occur between a fluid passing through the heat exchanger E within each reactor and the powder of thermal storage medium contained within the reactor.

The first side of heat exchanger E within R13 is connected to a pipe H5. The second side of heat exchanger E within R13 is connected to the first side of heat exchanger E within R12 via a pipe H4. The second side of heat exchanger E within R12 is connected to the first side of heat exchanger E within R11 via a pipe H3. The second side of heat exchanger E within R11 is connected to a pipe H2. A continuous channel that extends so as to sequentially connect the pipe H5, the heat exchanger E within R13, the pipe H4, the heat exchanger E within R12, the pipe H3, the heat exchanger E within R11, and the pipe H2, corresponds to, one of the "plurality of fluid channels", a "first fluid channel" ("fluid channel" disposed so as to correspond to the reaction section R1). The "first side" and "second side" of the "first fluid channel" respectively correspond to the pipe H5 and the pipe H2.

Similarly, the first side of heat exchanger E within R23 is connected to a pipe H10. The second side of heat exchanger E within R23 is connected to the first side of heat exchanger E within R22 via a pipe H11. The second side of heat exchanger E within R22 is connected to the first side of heat exchanger E within R21 via a pipe H12. The second side of heat exchanger E within R21 is connected to a pipe H13. A continuous channel that extends so as to sequentially connect the pipe H10, the heat exchanger E within R23, the pipe H11, the heat exchanger E within R22, the pipe H12, the heat exchanger E within R21, and the pipe H13 corresponds to, one of the "plurality of fluid channels", a "second fluid channel" (fluid channel disposed so as to correspond to the reaction section R2). The "first side" and "second side" of the "second fluid channel" respectively correspond to the pipe H10 and the pipe H13.

In summary, in the present embodiment, in the "first fluid channel" disposed so as to correspond to the reaction section R1, a position (within R12) where heat exchange occurs between a fluid flowing through the "first fluid channel" and M2 is closer to the first side than a position (within R11) where heat exchange occurs between the fluid and M1; and a position (within R13) where heat exchange occurs between the fluid and M3 is closer to the first side than the position (within R12) where heat exchange occurs between the fluid and M2.

Similarly, in the present embodiment, in the "second fluid channel" disposed so as to correspond to the reaction section R2, a position (within R22) where heat exchange occurs between a fluid flowing through the "second fluid channel" and M2 is closer to the first side than a position (within R21) where heat exchange occurs between the fluid and M1; and a position (within R23) where heat exchange occurs between the fluid and M3 is closer to the first side than the position (within R22) where heat exchange occurs between the fluid and M2.

In other words, in a case where the thermal storage media M1, M2, and M3 are respectively CaO, MgO, and $CaSO_4$, the present embodiment is configured to cause heat exchanges between a fluid flowing through each "fluid channel" and the thermal storage media disposed such that a "thermal storage medium having a higher transformation temperature" is positioned "closer to the first side" of the corresponding "fluid channel".

The evaporator DA and the condenser DB each contain water (or steam). The evaporator DA and the condenser DB also each include the above-described heat exchanger E therein. The heat exchangers E within the evaporator DA and the condenser DB are individually immersed in water contained within the evaporator DA and the condenser DB. Thus, heat exchanges can be caused between the "fluid flowing through the heat exchanger E within DA and the water contained within DA" and between the "fluid flowing through the heat exchanger E within DB and the water contained within DB". The heat exchanger E within DA is connected to a heating device L described later via pipes H7 and H8. The heat exchanger E within DB is connected to a cooling device K described later via pipes H22 and H23.

The present embodiment further includes four-way valves V1, V2, and V3. The four-way valve V1 is configured to individually allow or block connections between pipes H1, H2, H14, and H13. The four-way valve V2 is configured to individually allow or block connections between pipes H9, H10, H17, and H6. The four-way valve V3 is configured to individually allow or block connections between pipes H15, H5, H16, and H6. The four-way valves V2 and V3 are connected to each other via the pipe H6. The pipe H6 is connected to the pipe H7.

A pump P1 is placed at an intermediate point of the pipe H1. A pump P2 is placed at an intermediate point of the pipe H9. A pump P3 is placed at an intermediate point of the pipe H15. A pump P4 is placed at an intermediate point of the pipe H7. The pipes H1, H9, and H15 are used to introduce an "inflow gas" into the present embodiment (chemical heat pump); and the pipe H14 is used to discharge an "outflow gas" from the present embodiment (chemical heat pump), which will be described later.

The "controller" in FIG. 1 is configured to control the four-way valves V1 to V4, the pumps P1 to P4, the heating device L, and the cooling device K. The "controller" is an electronic controlling device including a microcomputer.

<Operations of Reaction Sections>

Hereinafter, before the overall operations of the present embodiment are described, operations of each "reaction section" will be described. The operations of the reaction section R1 alone are completely the same as those of the reaction section R2 alone. Accordingly, the operations of the reaction section R1 alone will only be described below.

The reaction section R1 is set to any one of a heat-storing state (state in which a portion of the heat of inflow gas is stored in the thermal storage media), a retention state (state in which the heat stored in the thermal storage media is retained in the thermal storage media), and a heat-release state (state in which the heat stored in the thermal storage media is used to output an outflow gas having a higher temperature than the inflow gas). Hereinafter, the heat-storing state, the retention state, and the heat-release state will be described in this order.

Heat-Storing State

Figure 2:
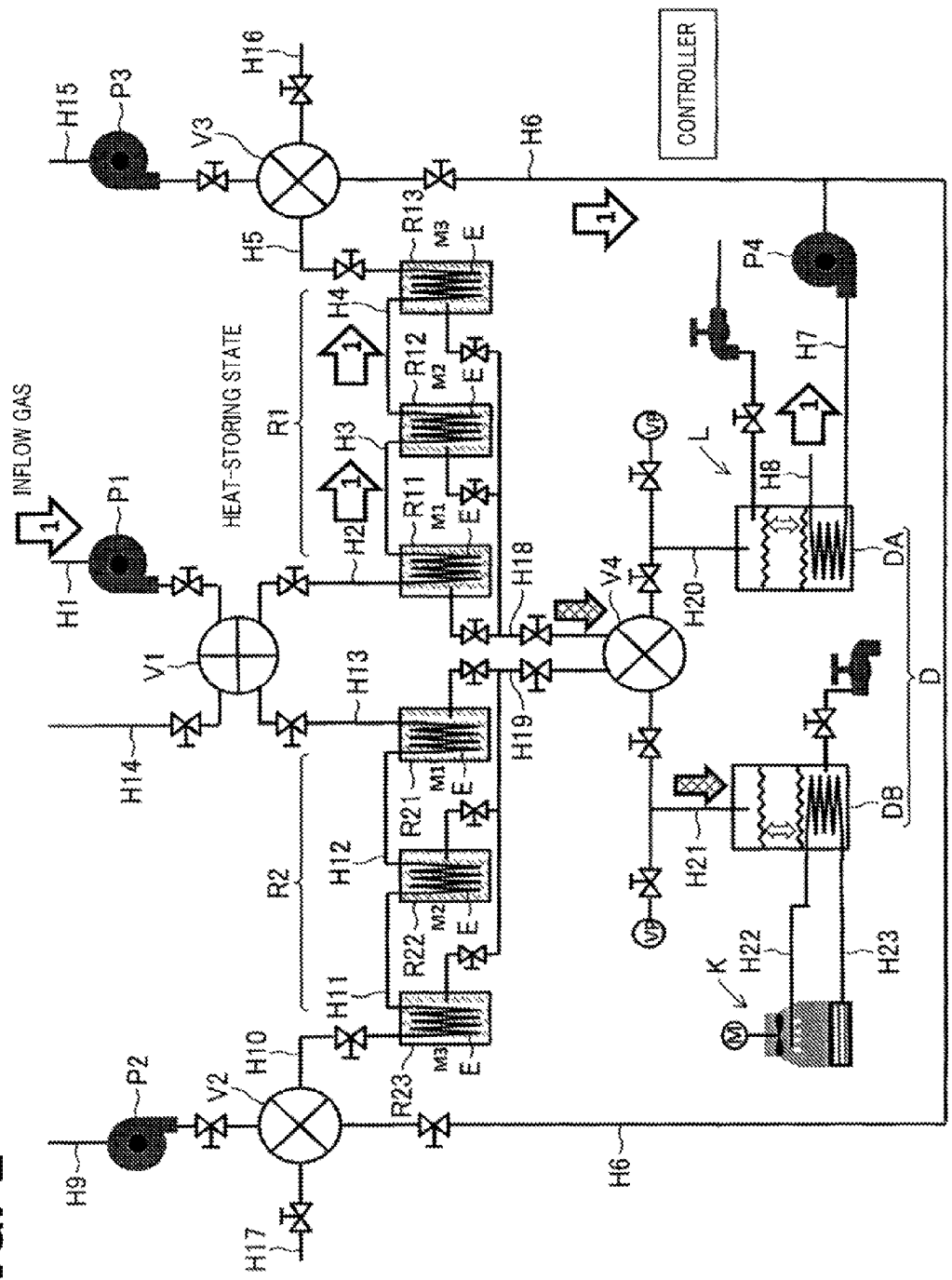
FIG. 2 illustrates an example of an operation state in which the reaction section R1 is set to a heat-storing state.

In the heat-storing state, as illustrated in FIG. 2, the four-way valve V1 is set to connect the pipe H1 to the pipe H2; the four-way valve V3 is set to connect the pipe H5 to the pipe H6; and the four-way valve V4 is set to connect the pipe H18 to the pipe H21. In addition, the pumps P1 and P4 are operated.

Upon operations of the pumps P1 and P4, an "inflow gas" (such as a high-temperature exhaust gas discharged from a factory) is introduced via the pipe H1, from the second side (pipe H2) of the "first fluid channel" into the "first fluid channel", caused to flow to the first side (pipe H5) of the "first fluid channel", subsequently caused to flow through the pipe H6, the pipe H7, the heat exchanger E within the evaporator DA, and the pipe H8, and discharged outside.

Accordingly, within the "first fluid channel", the inflow gas having been introduced from the second side of the "first fluid channel" sequentially passes the heat exchanger E within R11, the heat exchanger E within R12, and the heat exchanger E within R13, and subsequently moves to the first side of the "first fluid channel".

While the inflow gas flowing through the "first fluid channel" passes the heat exchanger E within each reactor, the hydrate of the thermal storage medium within the corresponding reactor receives heat from the inflow gas. As a result, because of the "second property", the "endothermic reaction" for the hydrate occurs within each reactor. As a result, within each reactor, the hydrate is dehydrated into the thermal storage medium itself (=dehydrated medium) and with an increase in the temperature of the thermal storage medium (in other words, the thermal storage medium stores heat). Incidentally, this "endothermic reaction" can occur only when the temperature of the inflow gas passing through the heat exchanger E within each reactor is equal to or higher than the transformation temperature of the thermal storage medium within the corresponding reactor. Within each reactor, this "endothermic reaction" can be continuously caused until the hydrate is consumed.

The steam (gas) generated by the dehydration within the reactors moves via the pipes H18 and H21 to the condenser DB. The steam having moved to DB turns into water (liquid) by phase transition (condensation). This water is stored in DB. On the other hand, every time when the inflow gas passes through the heat exchanger E within each reactor, the inflow gas is deprived of heat by the "endothermic reaction". As a result, the temperature of the inflow gas decreases by passing through the heat exchanger E of each reactor.

In summary, in the heat-storing state, when the inflow gas is caused to flow from the second side (pipe H2) into the "first fluid channel" to provide a "state in which, during passing of the inflow gas through the heat exchangers E within R11, R12, and R13, the inflow gas has a temperature higher than the transformation temperature of the corresponding thermal storage medium", heat can be stored in all the thermal storage media M1, M2, and M3. As a result, amount of heat stored in the thermal storage media in the whole reaction section R1 can be increased.

In order to provide and maintain the heat-storing state with stability, the transformation temperatures of the thermal storage media M1, M2, and M3 that vary in response to the ambient pressure need to be controlled (for example, maintained to be constant temperatures). Specifically, in the heat-storing state, water within the condenser DB receives heat of condensation derived from the phase transition (condensation) from steam to water. Accordingly, unless the temperature of water within DB is controlled, the temperature of water within DB continuously increases. With such an increase in the temperature of water within DB, the vapor pressure of water increases. This causes an increase in the ambient pressure of the thermal storage media M1, M2, and M3 within the reactors R11, R12, and R13. Such an increase in the ambient pressure causes an increase in the transformation temperatures of M1, M2, and M3.

Regarding this respect, in the present embodiment, in the heat-storing state, in order to control the transformation temperatures of the thermal storage media M1, M2, and M3 (for example, to maintain the temperatures to be constant), the condenser DB is provided with a "condenser fluid channel" including the pipe H22, the heat exchanger E, and the pipe H23. In the "condenser fluid channel", a fluid (such as water) is caused to flow in order to control the temperature of water within DB (for example, to maintain the temperature to be constant).

Specifically, as illustrated in FIG. 2, the "condenser fluid channel" is connected to the cooling device K. In the cooling device K, a fluid having a high temperature and flowing out from the first side (pipe H22) of the "condenser fluid channel" is cooled with a motor-driven fan; and the fluid having been cooled is introduced to the second side (pipe H23) of the "condenser fluid channel" with a pump (not shown). Thus, water within DB is heat-exchanged with the fluid flowing through the "condenser fluid channel" and, as a result, cooled. As a result, the temperature of water within DB can be controlled (for example, can be maintained to be a constant temperature). Incidentally, DB is equipped with a discharge valve for discharging water excessively stored within DB.

Retention State

When the heat thus stored in the thermal storage media M1, M2, and M3 in the reaction section R1 is retained, the four-way valve V4 is set to block the connection between the pipe H18 and the pipes H21 and H20. In addition, the pumps P1 and P4 are stopped. Thus, steam generated from water within the condenser DB cannot move to the reaction section R1. As a result, the "exothermic reactions" between steam and M1, M2, and M3 cannot occur. In other words, the thermal storage media M1, M2, and M3 within R11, R12, and R13 are retained in the "dehydrated medium" state. As a result, for a given period for which the four-way valve V4 is maintained in the above-described state, the heat stored in the thermal storage media M1, M2, and M3 (=dehydrated media) in the reaction section R1 can be retained in these media.

Heat-Release State

Figure 3:
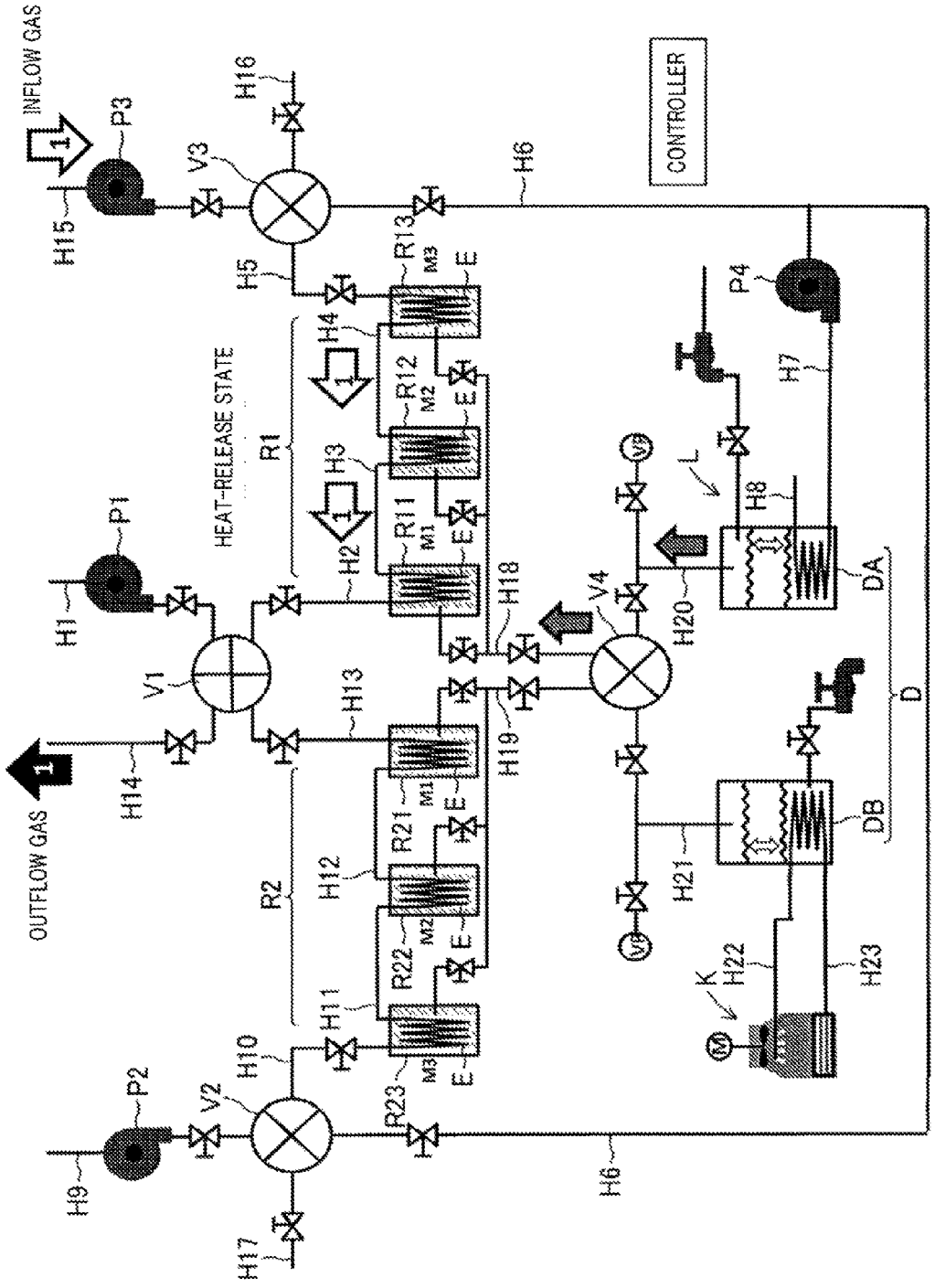
FIG. 3 illustrates an example of an operation state in which the reaction section R1 is set to a heat-release state.

In the heat-release state, as illustrated in FIG. 3, the four-way valve V1 is set to connect the pipe H2 to the pipe H14; the four-way valve V3 is set to connect the pipe H15 to the pipe H5; and the four-way valve V4 is set to connect the pipe H20 to the pipe H18. In addition, the pump P3 is operated.

Upon the operation of the pump P3, an "inflow gas" (such as a high-temperature exhaust gas discharged from a factory) is introduced via the pipe H15, from the first side (pipe H5) of the "first fluid channel" into the "first fluid channel", caused to flow to the second side (pipe H2) of the "first fluid channel", subsequently caused to flow through the pipe H14, and discharged outside as an "outflow gas".

Accordingly, within the "first fluid channel", the inflow gas having been introduced from the first side of the "first fluid channel" sequentially passes through the heat exchanger E within R13, the heat exchanger E within R12, and the heat exchanger E within R11, and subsequently moves to the second side of the "first fluid channel".

Since the four-way valve V4 is set as described above, the evaporator DA is connected to the reactors (R11, R12, and R13), so that steam generated by phase transition (evaporation) of water within DA moves into the reactors. As a result, because of the "first property", the "exothermic reaction" between the thermal storage medium and "steam" occurs within each reactor. Thus, the thermal storage medium within each reactor releases heat and turns into its hydrate.

While the inflow gas passing through the "first fluid channel" passes the heat exchanger E within each reactor, the inflow gas receives heat derived from "release of heat" by the "exothermic reaction" of the thermal storage medium within the corresponding reactor. As a result, the temperature of the inflow gas increases by passing through the heat exchanger E of each reactor. Stated another way, the temperature of the outflow gas can be made higher than that of the inflow gas. The "exothermic reaction" can occur only when the temperature of the inflow gas passing through the heat exchanger E within each reactor is less than the transformation temperature of the thermal storage medium within the corresponding reactor. Stated another way, the temperature of the inflow gas passing through the heat exchanger E within each reactor cannot be increased to a temperature equal to or higher than the transformation temperature of the thermal storage medium within the corresponding reactor. Within each reactor, the "exothermic reaction" can be continuously caused until the thermal storage medium is consumed or water is consumed within DA.

In summary, in the heat-release state, when the inflow gas is caused to flow from the first side (pipe H5) into the "first fluid channel" to provide a "state in which, during passing of the inflow gas through the heat exchangers E within R13, R12, and R11, the inflow gas has a temperature lower than the transformation temperature of the corresponding thermal storage medium", all the thermal storage media M1, M2, and M3 can release heat. As a result, in the whole reaction section R1, the amount of heat in the "outflow gas" discharged from the pipe 14 can be increased.

In order to provide and maintain the heat-release state with stability, the transformation temperatures of the thermal storage media M1, M2, and M3 that vary in response to the ambient pressure need to be controlled (for example, maintained to be constant temperatures). Specifically, in the heat-release state, water within the evaporator DA is deprived of heat of evaporation derived from the phase transition (evaporation) from water to steam. Accordingly, unless the temperature of water within DA is controlled, the temperature of water within DA continuously decreases. With such a decrease in the temperature of water within DA, the vapor pressure of water decreases. This causes a decrease in the ambient pressure of thermal storage media M1, M2, and M3 within the reactors R11, R12, and R13. Such a decrease in the ambient pressure causes a decrease in the transformation temperatures of M1, M2, and M3.

Regarding this respect, in the present embodiment, in the heat-release state, in order to control the transformation temperatures of the thermal storage media M1, M2, and M3 (for example, to maintain the temperatures to be constant), the evaporator DA is provided with an "evaporator fluid channel" including the pipe H7, the heat exchanger E, and the pipe H8. In the "evaporator fluid channel", a fluid (such as water) is caused to flow in order to control the temperature of water within DA (for example, to maintain the temperature to be constant).

Specifically, as illustrated in FIG. 3, the pipe H7 of the "evaporator fluid channel" is connected to the heating device L. In the heating device L, a fluid having a high temperature is introduced via the pipe H6 into the first side (pipe H7) of the "evaporator fluid channel". Thus, water within DA is heat-exchanged with the fluid flowing through the "evaporator fluid channel" and, as a result, heated. As a result, the temperature of water within DA can be controlled (for example, maintained to be a constant temperature). Incidentally, DA is equipped with an introduction valve for supplying water into DA upon deficiency of water. Thus, the operations of the reaction section R1 alone (and the operations of the reaction section R2 alone) have been described.

Overall Operations of the Present Embodiment

Hereinafter, the overall operations of the present embodiment will be described. As described above, the heat-release state (in other words, the exothermic reaction) can be continuously applied until the thermal storage media themselves (=dehydrated media) within a reaction section are consumed. Stated another way, in the heat-release state, an outflow gas having a higher temperature than the inflow gas can be output until thermal storage media themselves within the reaction section are consumed; however, after which, an outflow gas having a higher temperature than the inflow gas cannot be output. In addition, there is a limit on the amount of thermal storage media that can be contained in a single reaction section.

Figure 4:
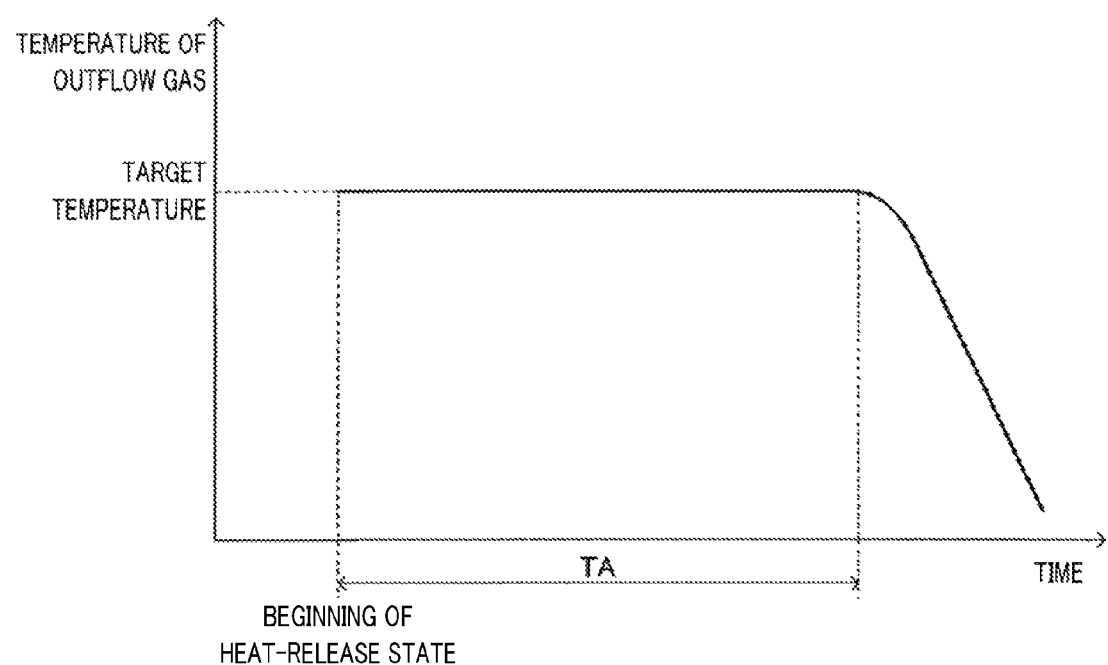
FIG. 4 is a graph illustrating an example of transition of the temperature of the outflow gas from the beginning of a heat-release state for a single reaction section.

Thus, a configuration employing a single reaction section has a limit on a period for which, in the heat-release state, as illustrated in FIG. 4, the temperature of the outflow gas can be maintained to be (substantially) constant at a "target temperature" (which is higher than the temperature of the inflow gas and equal to the transformation temperature of the thermal storage medium of the reaction section in the heat-release state). Stated another way, the configuration employing a single reaction section cannot meet a demand that the temperature of the outflow gas is maintained to be (substantially) constant at the "target temperature" over a given long period of time.

Accordingly, in the present embodiment, as described above, two reaction sections (the reaction section R1 and the reaction section R2) are simultaneously used. Specifically, a maximum period for which the temperature of the outflow gas can be maintained to be constant at the "target temperature" with a single reaction section is defined as a "duration TA" (constant) (refer to FIG. 4); and, in the present embodiment, a "first state in which the reaction section R1 is set to the heat-storing state and the reaction section R2 is set to the heat-release state" and a "second state in which the reaction section R1 is set to the heat-release state and the reaction section R2 is set to the heat-storing state" are alternately applied every time after the "duration TA" elapses.

Figure 5:
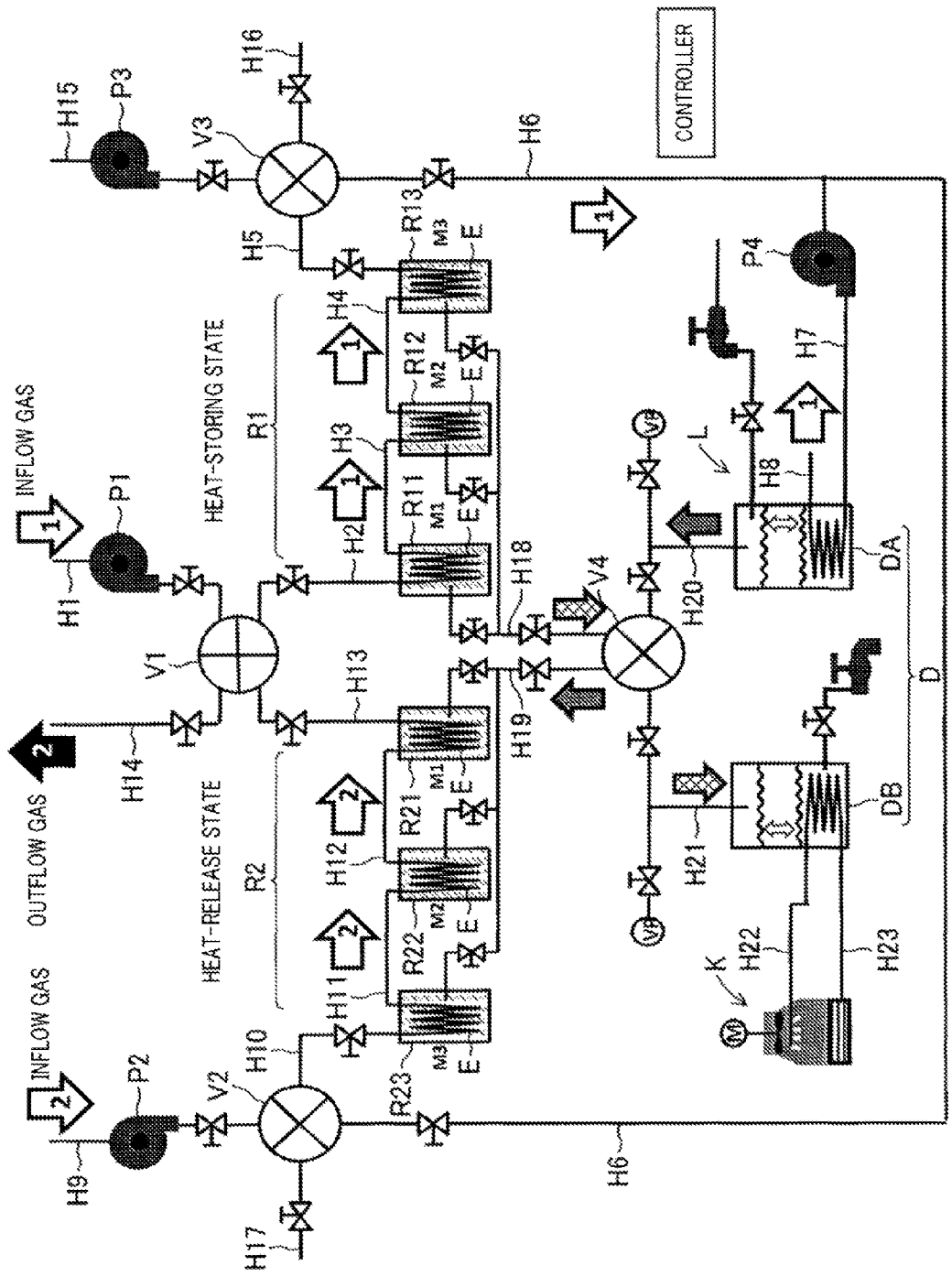
FIG. 5 illustrates an example of an operation state (in a first state) in which the reaction section R1 is set to a heat-storing state and the reaction section R2 is set to a heat-release state.

As illustrated in FIG. 5, in the "first state", the four-way valve V1 is set to connect the pipe H1 to the pipe H2 and to connect the pipe H13 to the pipe H14. The four-way valve V2 is set to connect the pipe H9 to the pipe H10. The four-way valve V3 is set to connect the pipe H5 to the pipe H6. The four-way valve V4 is set to connect the pipe H18 to the pipe H21 and to connect the pipe H19 to the pipe H20.

In addition, the pumps P1, P2, and P4 are operated. Inflow gases are introduced through the pipe H1 and the pipe H9; and an outflow gas is output from the pipe H14.

Specifically, as illustrated in FIG. 5, in the reaction section R1 in the heat-storing state, the "inflow gas" having been introduced via the pipe H1 is introduced from the second side (pipe H2) of the "first fluid channel" into the "first fluid channel", caused to flow to the first side (pipe H5) of the "first fluid channel", subsequently caused to flow through the pipe H6, the pipe H7, the heat exchanger E within the evaporator DA, and the pipe H8, and discharged outside. Simultaneously, in the reaction section R2 in the heat-release state, the "inflow gas" having been introduced via the pipe H9 is introduced from the first side (pipe H10) of the "second fluid channel" into the "second fluid channel", caused to flow to the second side (pipe H13) of the "second fluid channel", subsequently caused to flow through the pipe H14, and discharged outside as the "outflow gas".

In the "first state", in order that the transformation temperatures of the thermal storage media M1, M2, and M3 within the reaction section R2 are set to be higher than the trans formation temperatures of the thermal storage media M1, M2, and M3 within the reaction section R1, the heating device L and the cooling device K are controlled such that the temperature of steam within the evaporator DA connected to the reaction section R2 is higher than the temperature of steam within the condenser DB connected to the reaction section R1. As a result, a "state in which the temperature of the inflow gas passing through the heat exchanger E of each reactor within the reaction section R1 is equal to or higher than the transformation temperature of the thermal storage medium within the corresponding reactor, and the temperature of the inflow gas passing through the heat exchanger E of each reactor within the reaction section R2 is less than the transformation temperature of the thermal storage medium within the corresponding reactor" is achieved.

Figure 6:
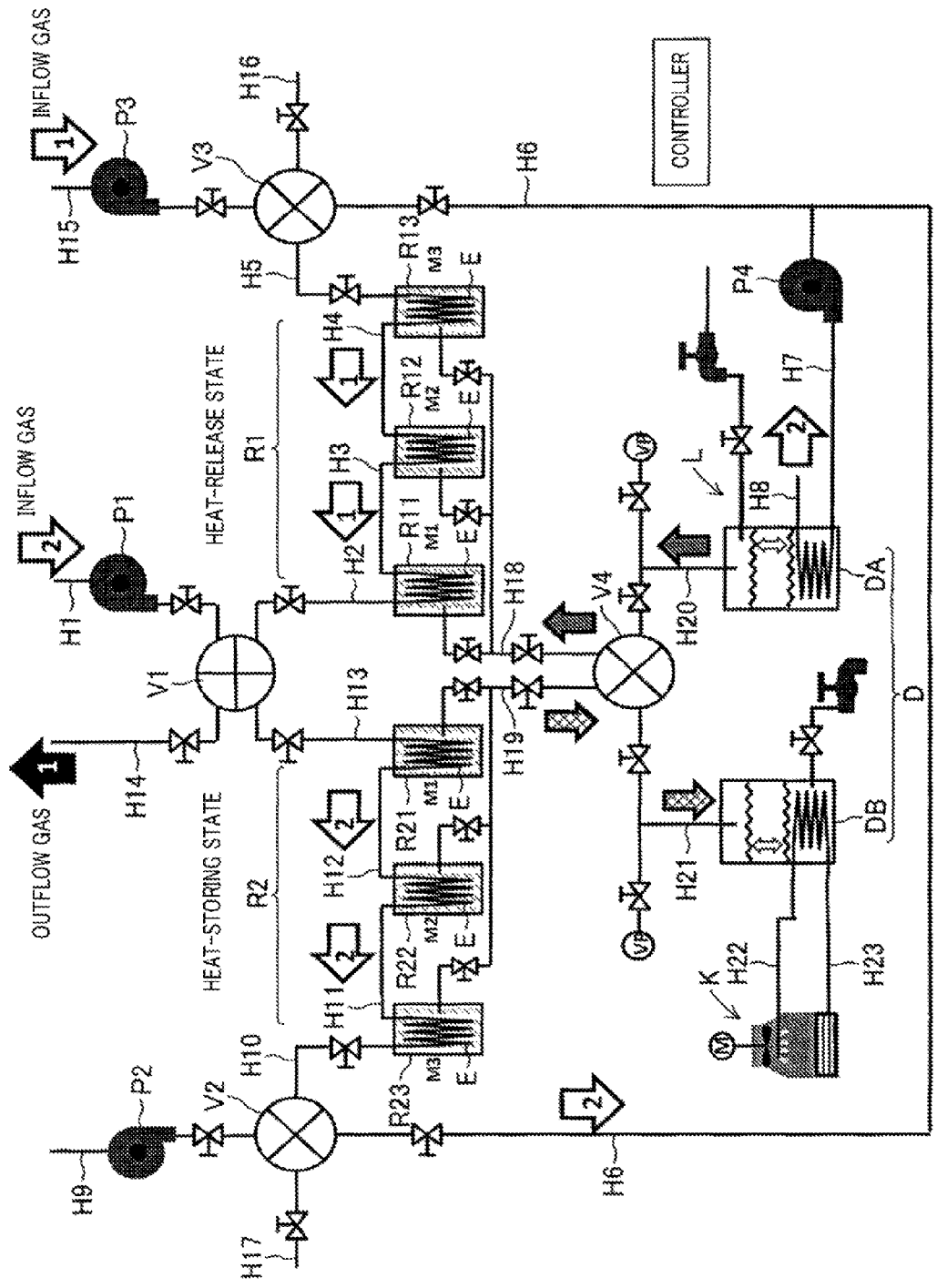
FIG. 6 illustrates an example of an operation state (in a second state) in which the reaction section R1 is set to a heat-release state and the reaction section R2 is set to a heat-storing state.

On the other hand, as illustrated in FIG. 6, in the "second state", the four-way valve V1 is set to connect the pipe H2 to the pipe H14 and to connect the pipe H1 to the pipe H13. The four-way valve V2 is set to connect the pipe H6 to the pipe H10. The four-way valve V3 is set to connect the pipe H15 to the pipe H5. The four-way valve V4 is set to connect the pipe H18 to the pipe H20 and to connect the pipe H19 to the pipe H21. In addition, the pumps P1, P3, and P4 are operated. Inflow gases are introduced through the pipe H1 and the pipe H15, and an outflow gas is output from the pipe H14.

Specifically, as illustrated in FIG. 6, in the reaction section R2 in the heat-storing state, the "inflow gas" having been introduced via the pipe H1 is introduced from the second side (pipe H13) of the "second fluid channel" into the "second fluid channel", caused to flow to the first side (pipe H10) of the "second fluid channel", subsequently caused to flow through the pipe H6, the pipe H7, the heat exchanger E within the evaporator DA, and the pipe H8, and discharged outside. Simultaneously, in the reaction section R1 in the heat-release state, the "inflow gas" having been introduced via the pipe H15 is introduced from the first side (pipe H5) of the "first fluid channel" into the "first fluid channel", caused to flow to the second side (pipe H2) of the "first fluid channel", subsequently caused to flow through the pipe H14, and discharged outside as the "outflow gas".

In the "second state", as in the "first state", in order that the transformation temperatures of the thermal storage media M1, M2, and M3 within the reaction section R1 are set to be higher than the transformation temperatures of the thermal storage media M1, M2, and M3 within the reaction section R2, the heating device L and the cooling device K are controlled such that the temperature of steam within the evaporator DA connected to the reaction section R1 is higher than the temperature of steam within the condenser DB connected to the reaction section R2. As a result, a "state in which the temperature of the inflow gas passing through the heat exchanger E of each reactor within the reaction section R2 is equal to or higher than the transformation temperature of the thermal storage medium within the corresponding reactor, and the temperature of the inflow gas passing through the heat exchanger E of each reactor within the reaction section R1 is less than the transformation temperature of the thermal storage medium within the corresponding reactor" is achieved.

Figure 7:
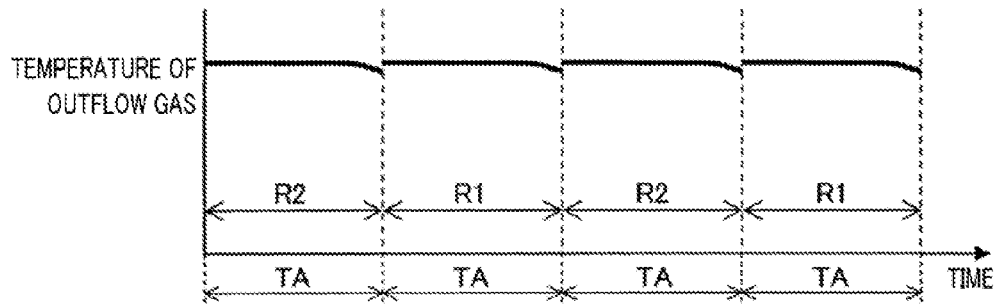
FIG. 7 is a graph illustrating an example of transition of the temperature of the outflow gas when the "first state" and the "second state" are alternately applied every time after the "duration" elapses.

As described above, in both of the "first state" and the "second state", the "outflow gas" can be output from the pipe H14. Thus, by applying alternately the "first state" and the "second state" every time after the "duration TA" elapses, as illustrated in FIG. 7, the temperature of the outflow gas output from the pipe H14 can be maintained to be (substantially) constant at the "target temperature" over a given long period of time.

Approach Dealing with Deterioration of Thermal Storage Medium

In general, the thermal storage medium contained within the reaction section gradually deteriorates with an increase in the total time for which the thermal storage medium undergoes the exothermic reaction and the endothermic reaction. The "thermal storage medium deteriorates" denotes a phenomenon in which the amount of heat storable per unit mass of thermal storage medium decreases.

Figure 8:
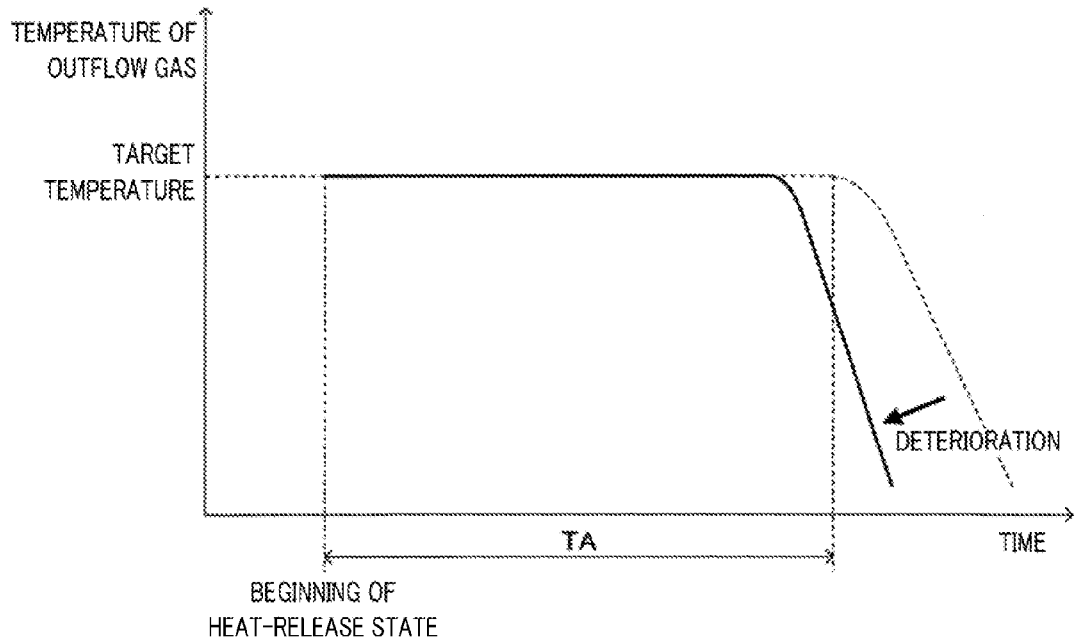
FIG. 8 is an explanatory view for a phenomenon of shortening of the period for which the temperature of the outflow gas can be maintained to be constant at the target temperature.
Figure 9:
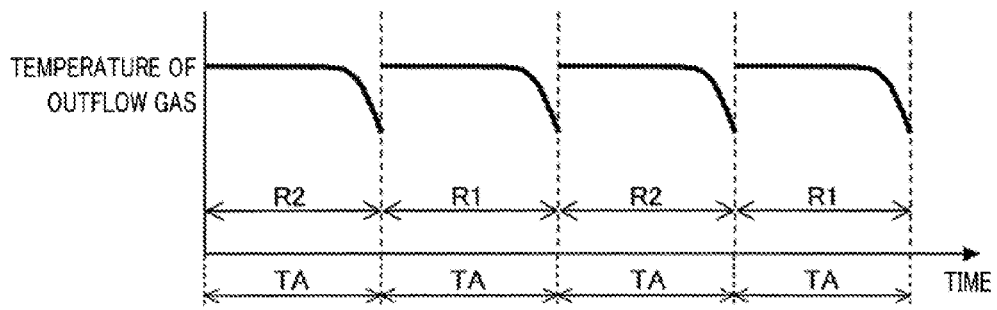
FIG. 9 is an explanatory view for a phenomenon in which the temperature of the outflow gas significantly decreases relative to the target temperature every time immediately before an exchange between the "first state" and the "second state".

In a case where the thermal storage medium has deteriorated, as illustrated in FIG. 8, the reaction sections can undergo a phenomenon in which the period for which the temperature of the outflow gas can be maintained to be constant at the "target temperature" shortens. In the case where the "first state" and the "second state" are alternately applied every time after the "duration TA" elapses as in the present embodiment, when the thermal storage medium has deteriorated, as illustrated in FIG. 8, the period for which the temperature of the outflow gas can be maintained to be constant at the "target temperature" becomes shorter than the "duration TA" for the reaction sections. In this case, as illustrated in FIG. 9, a phenomenon can occur in which the temperature of the outflow gas significantly decreases relative to the "target temperature" every time immediately before an exchange between the "first state" and the "second state". Stated another way, the temperature of the outflow gas cannot be maintained to be (substantially) constant at the "target temperature" with stability.

Hereafter, for each reaction section, attention will be directed to the gas flow direction (hereafter referred to as "heat-storing-time flow direction") within the "fluid channel" in the heat-storing state, and the gas flow direction (hereafter referred to as "heat-release-time flow direction") within the "fluid channel" in the heat-release state.

Studies by the inventor of the present invention have revealed that, depending on whether the "heat-storing-time flow direction" and the "heat-release-time flow direction" are the same or opposite to each other, there is a difference in the degree of shortening of the period for which the temperature of the outflow gas can be maintained to be constant at the "target temperature" when the thermal storage medium has deteriorated.

In the present embodiment, as is understood with reference to FIG. 5 and FIG. 6, for each reaction section, in the heat-storing state, the inflow gas is caused to flow from the second side to the first side of the corresponding "fluid channel", whereas, in the heat-release state, the inflow gas is caused to flow from the first side to the second side of the corresponding "fluid channel". In other words, for each reaction section, the "heat-storing-time flow direction" and the "heat-release-time flow direction" are opposite to each other.

Studies by the inventor of the present invention have revealed the following. Compared with a case where the "heat-storing-time flow direction" and the "heat-release-time flow direction" are the same (hereafter referred to as "Comparative example"), in a case where the "heat-storing-time flow direction" and the "heat-release-time flow direction" are opposite to each other as in the present embodiment, when the thermal storage medium has deteriorated, "the period for which the temperature of the outflow gas can be maintained to be constant at the target temperature shortens to a low degree". Hereinafter, this respect will be described with reference to FIG. 10 and FIG. 11. The very same description can be applied to both of the reaction section R1 and the reaction section R2. For this reason, the reaction section R1 alone is described in FIG. 10 and FIG. 11. Incidentally, FIG. 10 and FIG. 11 relate to cases where the same material is used as the thermal storage media M1, M2, and M3 in both of the reaction sections R1 and R2.

Figure 10:
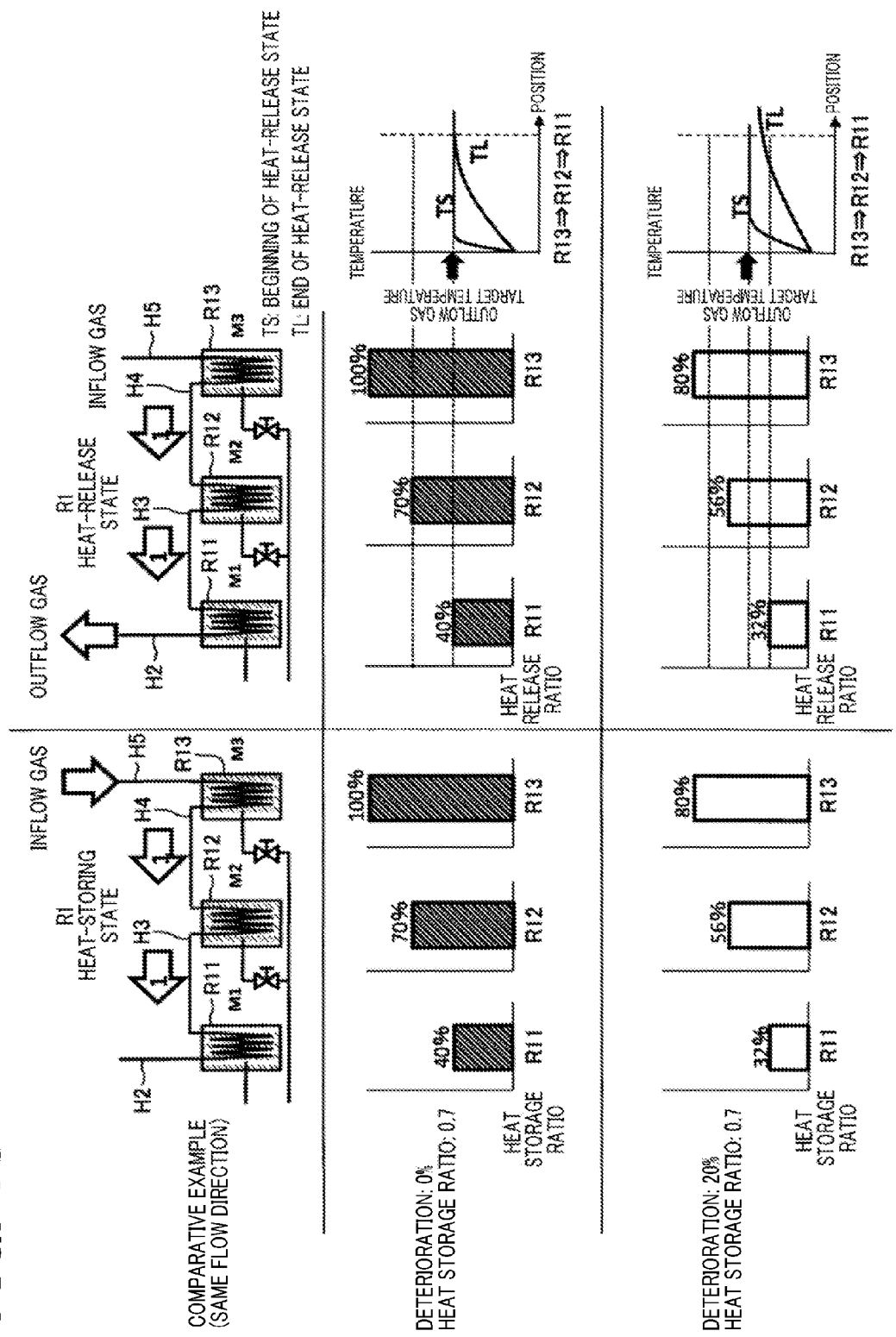

First, Comparative example will be described with reference to FIG. 10. In Comparative example, when the "first state" and the "second state" are alternately applied every time after the "duration TA" elapses, for the reaction section R1, as illustrated in FIG. 10, in both of the heat-storing state and the heat-release state, the inflow gas is caused to flow from the first side (pipe H5) to the second side (pipe H2) of the "first fluid channel". Incidentally, also for the reaction section R2, as in the reaction section R1, in both of the heat-storing state and the heat-release state, the inflow gas is caused to flow from the first side (pipe H10) to the second side (pipe H13) of the "second fluid channel".

Comparative Example: When Thermal Storage Medium is New (Deterioration: 0%)

When the thermal storage medium is new, as illustrated by a bar graph in the middle left portion of FIG. 10, in Comparative example in which the "first state" and the "second state" are alternately applied every time after the "duration TA" elapses, at every end of the heat-storing state of the reaction section R1, the reactors R13, R12, and R11 respectively have heat storage ratios of 100%, 70%, and 40%. As the whole reaction section R1, the heat storage ratio is 70%. The "heat storage ratio" is a ratio of the "amount of heat being stored in the thermal storage medium" to the "maximum amount of heat storable in the thermal storage medium". The "duration TA" is thus set such that the heat storage ratio of the reaction section is a value less than 100% (such as 60% to 80%).

Stated another way, within the reaction section R1, the heat storage ratio gradually decreases from the upstream to downstream of the inflow gas in the flow direction. This is probably because, from the upstream to downstream of the inflow gas in the flow direction, the "temperature of the inflow gas" gradually decreases, so that the temperature difference between the "temperature of the inflow gas" and the "transformation temperature of the thermal storage medium" (constant within the reaction section R1) gradually decreases. The larger the temperature difference, the larger the amount of heat transferred from the inflow gas to the thermal storage medium, which promotes the "endothermic reaction" of the thermal storage medium (in other words, storage of heat in the thermal storage medium).

When the thermal storage medium is new, as illustrated by a bar graph in the middle right portion of FIG. 10, in Comparative example in which the "first state" and the "second state" are alternately applied every time after the "duration TA" elapses, at every beginning of the heat-release state of the reaction section R1, the reactors R13, R12, and R11 respectively have heat release ratios of 100%, 70%, and 40%. This is because, as described above, at every end of the heat-storing state of the reaction section R1, the reactors R13, R12, and R11 respectively have heat storage ratios of 100%, 70%, and 40%. The "heat release ratio" is a ratio of the "amount of heat being releasable from the thermal storage medium" to the "maximum amount of heat releasable from the thermal storage medium".

As a result, as illustrated by a characteristic line TS on a graph in the middle right-end portion of FIG. 10, at the beginning of the heat-release state of the reaction section R1, from the upstream to downstream of the inflow gas in the flow direction, the temperature of the inflow gas initially increases sharply from the temperature within the pipe H5 to quickly reach the "target temperature" (=the transformation temperature of the thermal storage medium), and subsequently continues to be constant at the "target temperature". Accordingly, the temperature of the inflow gas within the pipe H2 (=the temperature of the outflow gas) is the "target temperature". This is probably because the heat release ratio is relatively low in the downstream of the inflow gas in the flow direction, whereas the heat release ratio is extremely high in the upstream of the inflow gas in the flow direction.

As time elapses from the beginning of the heat-release state of the reaction section R1, the heat release ratios of the reactors R13, R12, and R11 decrease. Thus, at the end of the heat-release state of the reaction section R1, the heat release ratios of the reactors R13, R12, and R11 have considerably decreased. Accordingly, as illustrated by a characteristic line TL on the graph in the middle right-end portion of FIG. 10, at the end of the heat-release state of the reaction section R1, from the upstream to downstream of the inflow gas in the flow direction, the temperature of the inflow gas relatively gently increases from the temperature within the pipe H5 toward the "target temperature" (=the transformation temperature of the thermal storage medium), and reaches the "target temperature" at a downstream position. Thus, the temperature of the inflow gas within the pipe H2 (=the temperature of the outflow gas) is still maintained at the "target temperature".

In summary, in Comparative example, when the thermal storage medium is new, for the reaction section R1, as illustrated in FIG. 4 described above, the temperature of the outflow gas can be maintained at the "target temperature" over the "duration TA" from the beginning to end of the heat-release state. This also applies to the reaction section R2. Accordingly, as illustrated in FIG. 7 described above, the temperature of the outflow gas output from the pipe H14 can be maintained to be (substantially) constant at the "target temperature" over a given long period of time.

Comparative Example: When Thermal Storage Medium has Deteriorated (Deterioration: 20%)

When the thermal storage medium has deteriorated (deterioration: 20%), as illustrated by a bar graph in the lower left portion of FIG. 10, in Comparative example, at every end of the heat-storing state of the reaction section R1, the heat storage ratios of the reactors R13, R12, and R11 are respectively 80%, 56%, and 32%. As the whole reaction section R1, the heat storage ratio is 70%.

Thus, as illustrated by a bar graph in the lower right portion of FIG. 10, in Comparative example, at every beginning of the heat-release state of the reaction section R1, the heat release ratios of the reactors R13, R12, and R11 are respectively 80%, 56%, and 32%.

As a result, as illustrated by a characteristic line TS on a graph in the lower right-end portion of FIG. 10, at the beginning of the heat-release state of the reaction section R1, from the upstream to downstream of the inflow gas in the flow direction, the temperature of the inflow gas initially increases relatively sharply from the temperature within the pipe H5 to reach the "target temperature" (=the transformation temperature of the thermal storage medium), and subsequently continues to be constant at the "target temperature". Accordingly, the temperature of the inflow gas within the pipe H2 (=the temperature of the outflow gas) is the "target temperature". The rate of increase in the temperature of the inflow gas is lower than that in "when thermal storage medium is new". This is because the heat release ratio of the thermal storage medium within the reactor R13 has become lower than that in "when thermal storage medium is new".

As time elapses from the beginning of the heat-release state of the reaction section R1, the heat release ratios of the reactors R13, R12, and R11 individually decrease. Thus, at the end of the heat-release state of the reaction section R1, the heat release ratios of the reactors R13, R12, and R11 have considerably decreased. Accordingly, as illustrated by a characteristic line TL on the graph in the lower right-end portion of FIG. 10, at the end of the heat-release state of the reaction section R1, from the upstream to downstream of the inflow gas in the flow direction, the temperature of the inflow gas very gently increases from the temperature within the pipe H5 toward the "target temperature" (=the transformation temperature of the thermal storage medium) and does not reach the "target temperature" even at downstream positions. Thus, the temperature of the inflow gas within the pipe H2 (=the temperature of the outflow gas) is much lower than the "target temperature".

In summary, in Comparative example, when the thermal storage medium has deteriorated (deterioration: 20%), for the reaction section R1, as illustrated in FIG. 8 described above, in the heat-release state, the period for which the temperature of the outflow gas can be maintained to be constant at the "target temperature" becomes shorter than the "duration TA". This also applies to the reaction section R2. Accordingly, as illustrated in FIG. 9 described above, every time immediately before an exchange between the "first state" and the "second state" is performed, a phenomenon can occur in which the temperature of the outflow gas output from the pipe H14 becomes much lower than the "target temperature".

Figure 11:
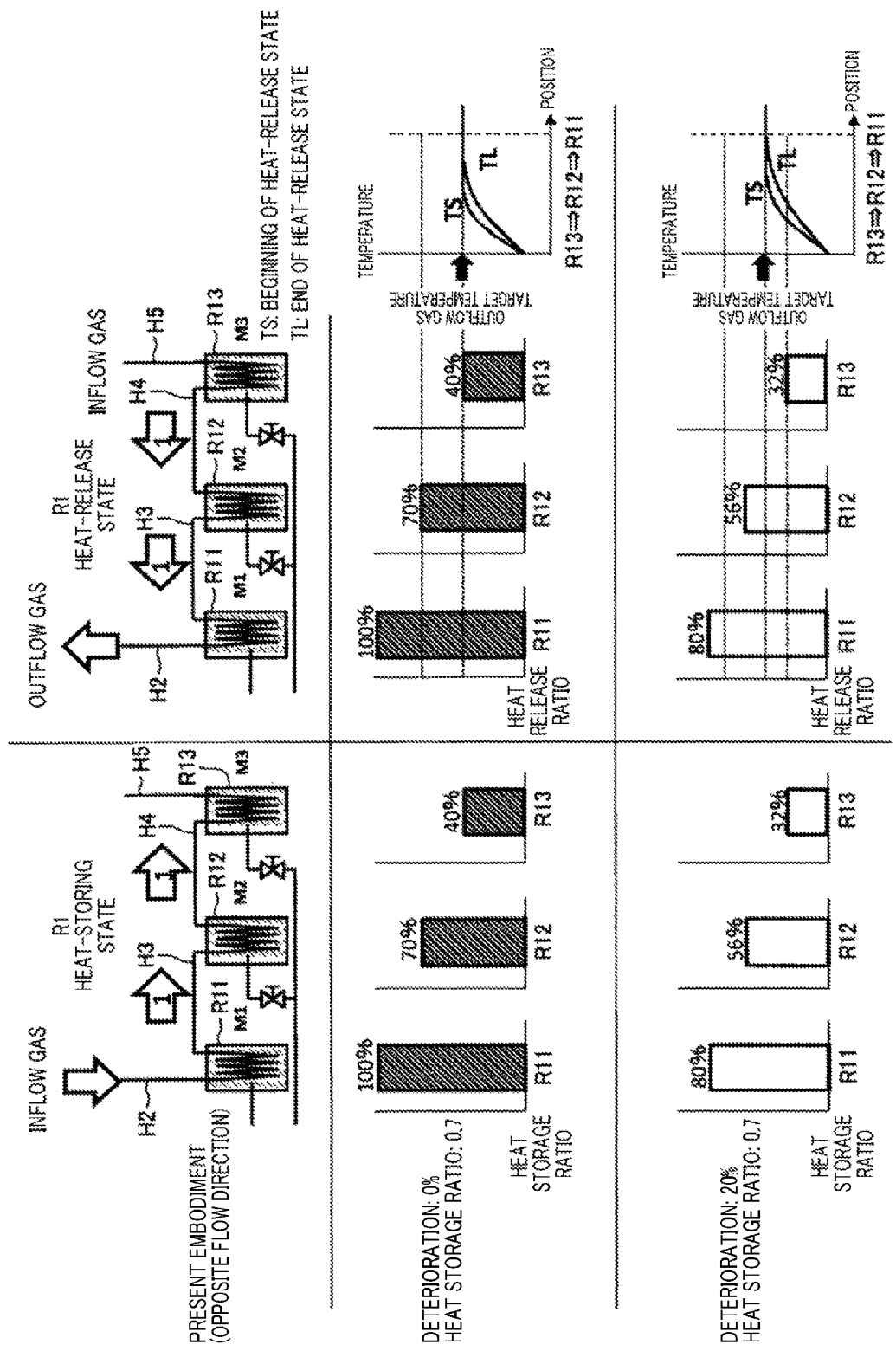

Hereinafter, the present embodiment will be described with reference to FIG. 11. In the present embodiment, when the "first state" and the "second state" are alternately applied every time after the "duration TA" elapses, for the reaction section R1, as illustrated in FIG. 11, in the heat-release state, the inflow gas is caused to flow from the first side (pipe H5) to the second side (pipe H2) of the "first fluid channel", whereas, in the heat-storing state, the inflow gas is caused to flow from the second side (pipe H2) to the first side (pipe H5) of the "first fluid channel". Incidentally, also for the reaction section R2, as in the reaction section R1, in the heat-release state, the inflow gas is caused to flow from the first side (pipe H10) to the second side (pipe H13) of the "second fluid channel", whereas, in the heat-storing state, the inflow gas is caused to flow from the second side (pipe H13) to the first side (pipe H10) of the "second fluid channel".

Present Embodiment: When Thermal Storage Medium is New (Deterioration: 0%)

When the thermal storage medium is new, as illustrated by a bar graph in the middle left portion of FIG. 11, in the present embodiment in which the "first state" and the "second state" are alternately applied every time after the "duration TA" elapses, at every end of the heat-storing state of the reaction section R1, the heat storage ratios of the reactors R11, R12, and R13 are respectively set to 100%, 70%, and 40%. As the whole reaction section R1, the heat storage ratio is set to 70%. Thus, as in Comparative example described above, within the reaction section R1, from the upstream to downstream of the inflow gas in the flow direction, the heat storage ratio gradually decreases.

When the thermal storage medium is new, as illustrated by a bar graph in the middle right portion of FIG. 11, in the present embodiment in which the "first state" and the "second state" are alternately applied every time after the "duration TA" elapses, at every beginning of the heat-release state of the reaction section R1, the heat release ratios of the reactors R11, R12, and R13 are respectively 100%, 70%, and 40%.

As a result, as illustrated by a characteristic line TS on a graph in the middle right-end portion of FIG. 11, at the beginning of the heat-release state of the reaction section R1, from the upstream to downstream of the inflow gas in the flow direction, the temperature of the inflow gas increases relatively sharply from the temperature within the pipe H5 to reach the "target temperature" (=the transformation temperature of the thermal storage medium), subsequently continues to be constant at the "target temperature". Accordingly, the temperature of the inflow gas within the pipe H2 (=the temperature of the outflow gas) is the "target temperature". This is probably because the heat release ratio is relatively low in the upstream of the inflow gas in the flow direction, whereas the heat release ratio is extremely high in the downstream of the inflow gas in the flow direction.

As time elapses from the beginning of the heat-release state of the reaction section R1, the heat release ratios of the reactors R11, R12, and R13 decrease. Thus, at the end of the heat-release state of the reaction section R1, the heat release ratios of the reactors R11, R12, and R13 have considerably decreased. Accordingly, as illustrated by a characteristic line TL on the graph in the middle right-end portion of FIG. 11, at the end of the heat-release state of the reaction section R1, from the upstream to downstream of the inflow gas in the flow direction, the temperature of the inflow gas relatively gently increases from the temperature within the pipe H5 toward the "target temperature" (=the transformation temperature of the thermal storage medium), and reaches the "target temperature" at a downstream position. Thus, the temperature of the inflow gas within the pipe H2 (=the temperature of the outflow gas) is still maintained at the "target temperature".

In summary, in the present embodiment, when the thermal storage medium is new, for the reaction section R1, as illustrated in FIG. 4 described above, the temperature of the outflow gas can be maintained at the "target temperature" over the "duration TA" from the beginning to end of the heat-release state. This also applies to the reaction section R2. Accordingly, as illustrated in FIG. 7 described above, the temperature of the outflow gas output from the pipe H14 can be maintained to be (substantially) constant at the "target temperature" over a given long period of time.

Present Embodiment: When Thermal Storage Medium has Deteriorated (Deterioration: 20%)

When the thermal storage medium has deteriorated (deterioration: 20%), as illustrated by a bar graph in the lower left portion of FIG. 11, in the present embodiment, at every end of the heat-storing state of the reaction section R1, the heat storage ratios of the reactors R11, R12, and R13 are respectively set to 80%, 56%, and 32%. As the whole reaction section R1, the heat storage ratio is set to 70%.

Thus, as illustrated by a bar graph in the lower right portion of FIG. 11, in the present embodiment, at every beginning of the heat-release state of the reaction section R1, the heat release ratios of the reactors R11, R12, and R13 are respectively 80%, 56%, and 32%.

As a result, as illustrated by a characteristic line TS on a graph in the lower right-end portion of FIG. 11, at the beginning of the heat-release state of the reaction section R1, from the upstream to downstream of the inflow gas in the flow direction, the temperature of the inflow gas increases relatively sharply from the temperature within the pipe H5 to reach the "target temperature" (=the transformation temperature of the thermal storage medium), and subsequently continues to be constant at the "target temperature". Accordingly, the temperature of the inflow gas within the pipe H2 (=the temperature of the outflow gas) is the "target temperature". The rate of increase in the temperature of the inflow gas is lower than that in "when thermal storage medium is new". This is because the heat release ratio of the thermal storage medium within the reactor R13 has become lower than that in "when thermal storage medium is new".

As time elapses from the beginning of the heat-release state of the reaction section R1, the heat release ratios of the reactors R11, R12, and R13 decrease. Thus, at the end of the heat-release state of the reaction section R1, the heat release ratios of the reactors R11, R12, and R13 have considerably decreased. However, as illustrated by a characteristic line TL on the graph in the lower right-end portion of FIG. 11, even at the end of the heat-release state of the reaction section R1, as in the beginning of the heat-release state of the reaction section R1 (refer to the characteristic line TS), from the upstream to downstream of the inflow gas in the flow direction, the temperature of the inflow gas increases from the temperature within the pipe H5 to reach the "target temperature" (=the transformation temperature of the thermal storage medium), and subsequently continues to be constant at the "target temperature". Thus, the temperature of the inflow gas within the pipe H2 (=the temperature of the outflow gas) is the "target temperature". This is probably because the heat release ratio is extremely low in the upstream of the inflow gas in the flow direction, whereas the heat release ratio is still sufficiently high in the downstream of the inflow gas in the flow direction.

In summary, in the present embodiment, even when the thermal storage medium has deteriorated (deterioration: 20%), for the reaction section R1, as illustrated in FIG. 4 described above, the temperature of the outflow gas can be maintained at the "target temperature" over the "duration TA" from the beginning to end of the heat-release state. This also applies to the reaction section R2. Accordingly, as illustrated in FIG. 7 described above, the temperature of the outflow gas output from the pipe H14 can be maintained to be (substantially) constant at the "target temperature" over a given long period of time.

In summary, compared with Comparative example (the "heat-storing-time flow direction" and the "heat-release-time flow direction" are the same), the present embodiment (the "heat-storing-time flow direction" and the "heat-release-time flow direction" are opposite to each other) tends not to undergo the phenomenon in which the temperature of the outflow gas becomes much lower than the "target temperature" every time immediately before an exchange between the "first state" and the "second state" (refer to FIG. 9). Stated another way, the temperature of the outflow gas can be maintained to be (substantially) constant at the "target temperature" with more stability over a given long period of time.

The present invention is not limited to the above-described present embodiment and can encompass various modifications within the scope of the present invention. For example, in the above-described present embodiment, the reaction sections (reaction sections R1 and R2) each include three separate and independent reactors; alternatively, each reaction section may include a single continuous reactor.

In the above-described present embodiment, the "duration TA" that defines the timing at which an exchange between the "first state" and the "second state" is performed is a period (=constant period) determined in advance by experiments or the like. Alternatively, the "duration TA" may be changed in response to a state in the reaction sections (for example, the degree of deterioration of the thermal storage medium).

In the above-described present embodiment, two reaction sections R1 and R2 are provided as the "plurality of reaction sections". Alternatively, as the "plurality of reaction sections", three or more reaction sections may be provided. In this case, the "controller" is configured to sequentially select, every time after the "first period" elapses, a reaction section as the "heat-release reaction section" from the "plurality of reaction sections". The "controller" is configured to cause a fluid to flow through a "fluid channel" corresponding to the "heat-release reaction section" from the first side to the second side of the "fluid channel" over the "first period", the fluid having a temperature lower than the transformation temperature of the thermal storage medium contained in the "heat-release reaction section", so that the "heat-release reaction section" is set to the "heat-release state" over the "first period". In addition, the "controller" is configured to, for each reaction section, after an elapse of a period of being selected as the "heat-release reaction section" and before beginning of a period of being selected again as the "heat-release reaction section", cause a fluid to flow from the second side to the first side of the "fluid channel" over a "second period", the fluid having a temperature higher than the transformation temperature of the thermal storage medium contained in the reaction section, so that the reaction section is set to the "heat-storing state" over the "second period".

In this case, the "first period" and the "second period" may have the same length or different lengths. The "first period" and the "second period" may each have a constant length or the length may be changed in response to the state of the reaction sections. The order of reaction sections selected as the "heat-release reaction section" from the "plurality of reaction sections" may be determined in advance, or may be changed in response to the state of reaction sections. The reaction section being selected as the "heat-release reaction section" from the "plurality of reaction sections" is set to the "heat-release state", whereas the reaction sections not being selected as the "heat-release reaction section" from the "plurality of reaction sections" are set to the "heat-storing state" or the "retention state".

In the above-described present embodiment, each "fluid channel" is constituted by a single continuous channel. Alternatively, each "fluid channel" may be constituted by a plurality of continuous channels connected in parallel.

In the above-described present embodiment, as the three thermal storage media M1, M2, and M3 having different transformation temperatures, CaO, MgO, and $CaSO_4$ are used. Regarding M3, $CaSO_4$ may be replaced by $CaCl_2$.

Specifically, $CaCl_2$ has, as with $CaSO_4$, the first property (property of "undergoing an exothermic reaction with steam and forming a hydrate with release of heat"), and the second property of the hydrate (property of "upon receiving of external heat, undergoing an endothermic reaction for the hydrate and being dehydrated through release of steam from the hydrate and with storing of heat").

$CaCl_2$ is involved in the reaction represented by the following Formula (4). In Formula (4), "Q" represents thermal energy and "n" represents a given positive integer. In Formula (4), $CaCl_2 \cdot nH_2O$ represents a hydrate of $CaCl_2$.

$CaCl_2 \cdot nH_2O + Q \rightarrow CaCl_2 + nH_2O$ (endothermic reaction)

$CaCl_2 \cdot nH_2O + Q \leftarrow CaCl_2 + nH_2O$ (exothermic reaction)     (4)

Also in the above-described case where the thermal storage media M1, M2, and M3 are CaO, MgO, and $CaCl_2$, the relationship "the transformation temperature of CaO (=M1) is higher than the transformation temperature of MgO (=M2), and the transformation temperature of MgO (=M2) is higher than the transformation temperature of $CaCl_2$ (=M3)" (at a given ambient pressure) is satisfied.

In the above-described present embodiment, as the plurality of thermal storage media having different transformation temperatures, thermal storage media having the first property and the second property are used. Another thermal storage medium may be used that has a property (third property) of "undergoing an exothermic reaction with carbon dioxide and forming a carbonate with release of heat" and a property of the carbonate (fourth property) of "upon receiving of external heat, undergoing an endothermic reaction for the carbonate and being decarbonated through release of carbon dioxide from the carbonate and with storing of heat".

Specifically, two thermal storage media M1 and M2 having the third property and the fourth property and having different transformation temperatures are respectively, for example, CaO and MgO. In this case, the "transformation temperatures" are each defined as a temperature corresponding to the temperature critical point of state transformation between the "thermal storage medium itself (=decarbonated substance)" and "its carbonate".

CaO and MgO are respectively involved in reactions represented by the following Formula (5) and Formula (6). In each Formula, "Q" represents thermal energy. In Formula (5), $CaCO_3$ is the carbonate of CaO. In Formula (6), $MgCO_3$ is the carbonate of MgO.

$CaCO_3 + Q \rightarrow CaO + CO_2$ (endothermic reaction)

$CaCO_3 + Q \leftarrow CaO + CO_2$ (exothermic reaction)     (5)

$MgCO_3 + Q \rightarrow MgO + CO_2$ (endothermic reaction)

$MgCO_3 + Q \leftarrow MgO + CO_2$ (exothermic reaction)     (6)

In the case where the thermal storage media M1 and M2 are CaO and MgO, the relationship "the transformation temperature of CaO (=M1) is higher than the transformation temperature of MgO (=M2)" (at a given ambient pressure) is satisfied.

In summary, such a configuration may be employed in which the thermal storage media M1 and M2 are CaO and MgO (M3 is omitted) and the condensation section contains "carbon dioxide" instead of "steam".

The present application claims priority from Japanese Patent Application No. 2014-258823 filed on Dec. 22, 2014, the entire contents of which are incorporated herein by reference.

What is claimed is:

1. A chemical heat pump comprising:
a plurality of reaction sections each containing a thermal storage medium that undergoes an exothermic reaction and an endothermic reaction;
an evaporation-condensation section that contains a substance involved in the reactions of the thermal storage medium and is configured to cause phase transition of the substance between a gas phase and a liquid phase;
a connection section connecting the reaction sections to the evaporation-condensation section;
a plurality of fluid channels individually disposed so as to correspond to the reaction sections such that heat exchange is caused between a fluid flowing through each of the fluid channels and the thermal storage medium contained in the corresponding reaction section; and
a controller configured to control fluid-flows in the fluid channels,
wherein the controller is configured to sequentially select, every time after a first period elapses, a reaction section as a heat-release reaction section from the plurality of reaction sections,
the controller is configured to cause a fluid to flow through the fluid channel corresponding to the heat-release reaction section from a first side to a second side of the fluid channel over the first period, the fluid having a temperature lower than a transformation temperature of the thermal storage medium contained in the heat-release reaction section, so that the heat-release reaction section is set to a heat-release state in which the thermal storage medium releases heat to the fluid by the exothermic reaction over the first period, and
for each of the reaction sections, after an elapse of a period of being selected as the heat-release reaction section and before beginning of a period of being selected again as the heat-release reaction section, the controller is configured to cause a fluid to flow from the second side to the first side of the fluid channel over a second period, the fluid having a temperature higher than the transformation temperature of the thermal storage medium contained in the reaction section, so that the reaction section is set to a heat-storing state in which the thermal storage medium stores heat by the endothermic reaction over the second period.

2. The chemical heat pump according to claim 1,
wherein the plurality of reaction sections are a first reaction section and a second reaction section,
the first period and the second period haw the same length, and
the controller is configured to apply alternately, every time after the first period elapses, a first state in which the first reaction section is set to the heat-storing state and the second reaction section is set to the heat-release state, and a second state in which the first reaction section is set to the heat-release state and the second reaction section is set to the heat-storing state.

3. The chemical heat pump according to claim 1,
wherein the thermal storage medium is a substance that undergoes the exothermic reaction with steam and forms a hydrate with release of heat, and the hydrate, upon receiving of external heat, undergoes the endothermic reaction and is dehydrated through release of steam and with storing of heat, and a substance involved in the reactions of the thermal storage medium is steam.

4. The chemical heat pump according to claim 2,
wherein the thermal storage medium is a substance that undergoes the exothermic reaction with steam and forms a hydrate with release of heat, and the hydrate, upon receiving of external heat, undergoes the endothermic reaction and is dehydrated through release of steam and with storing of heat, and a substance involved in the reactions of the thermal storage medium is steam.

5. The chemical heat pump according to claim 3,
wherein the thermal storage medium is at least one selected from CaO, MgO, CaSO4, and CaCl2.

6. The chemical heat pump according to claim 4,
wherein the thermal storage medium is at least one selected from CaO, MgO, CaSO4, and CaCl2.

7. The chemical heat pump according to claim 1,
wherein the thermal storage medium is a substance that undergoes the exothermic reaction with carbon dioxide and forms a carbonate with release of heat, and the carbonate, upon receiving of external heat, undergoes the endothermic reaction and is decarbonated through release of carbon dioxide and with storing of heat, and a substance involved in the reactions of the thermal storage medium is carbon dioxide.

8. The chemical heat pump according to claim 2,
wherein the thermal storage medium is a substance that undergoes the exothermic reaction with carbon dioxide and forms a carbonate with release of heat, and the carbonate, upon receiving of external heat, undergoes the endothermic reaction and is decarbonated through release of carbon dioxide and with storing of heat, and a substance involved in the reactions of the thermal storage medium is carton dioxide.

9. The chemical heat pump according to claim 7,
wherein the thermal storage medium is one or both of CaO and MgO.

10. The chemical heat pump according to claim 8,
wherein the thermal storage medium is one or both of CaO and MgO.

* * * * *